United States Patent
Temple et al.

[11] 3,730,561
[45] May 1, 1973

[54] SWIVEL-TYPE CARRIER FOR AUTOMATIC AIR HOSE CONNECTOR

[75] Inventors: Fred Temple, Pittsburgh; William H. Reno, Monroeville, both of Pa.

[73] Assignee: Westinghouse Air Brake Company, Wilmerding, Pa.

[22] Filed: Apr. 17, 1972

[21] Appl. No.: 244,391

[52] U.S. Cl..................................285/12, 285/63
[51] Int. Cl..............................................F16l 55/00
[58] Field of Search....................285/12, 63, 62, 25, 285/24, 27, 26, 28, 29, 73

[56] References Cited
UNITED STATES PATENTS 3,312,481  4/1967  Temple ................................285/12
3,476,407  11/1969  Temple et al..........................285/12

Primary Examiner—Thomas F. Callaghan
Attorney—Ralph W. McIntire, Jr. et al.

[57] ABSTRACT

This invention relates to a swivel-type carrier for rockably supporting an automatic-type air hose connector on and beneath the car coupler of a railway vehicle. The carrier comprises two members, one end of a first member having a resilient connection with the car coupler and the other end constituting a hollow cylinder that is rigidly connected to one end of a sleeve disposed therein. The second member of the carrier is in the form of an off-set arm one end of which has the automatic-type air hose connector removably secured thereto. The other end of this second member constitutes a second hollow cylinder rockably mounted on the other end of the sleeve, while a manually operable lock carried thereby is disengaged from a locking member secured to the lower end of this sleeve, to a position in which manual coupling between the automatic-type air hose connector and a standard manual-type air hose coupling carried in the end of the air hose provided at the adjacent end of another car may be effected. The construction and arrangement of the elements comprising the swivel-type carrier and lock therefor are such that, upon movement of the other railway car away from the one car, subsequent to uncoupling the couplers between these two cars, far enough to cause disengagement between the automatic-type air hose connector on the one car and the standard manual-type air hose coupling on the other car, the automatic-type air hose connector on the one car is automatically returned to and locked in the position for automatic coupling with a like automatic-type air hose connector carried at the adjacent end of a third car that may be coupled to the one car.

15 Claims, 6 Drawing Figures

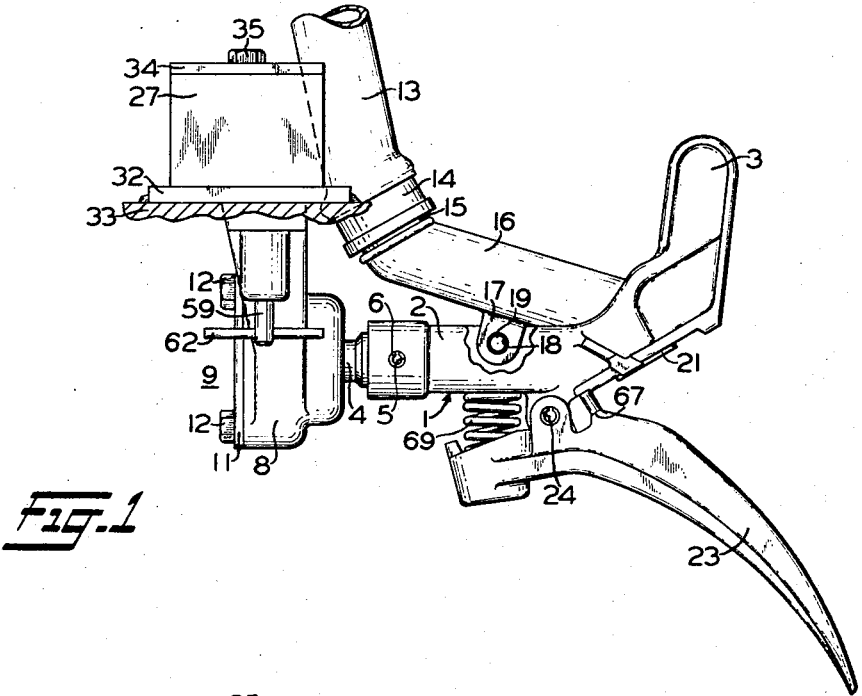
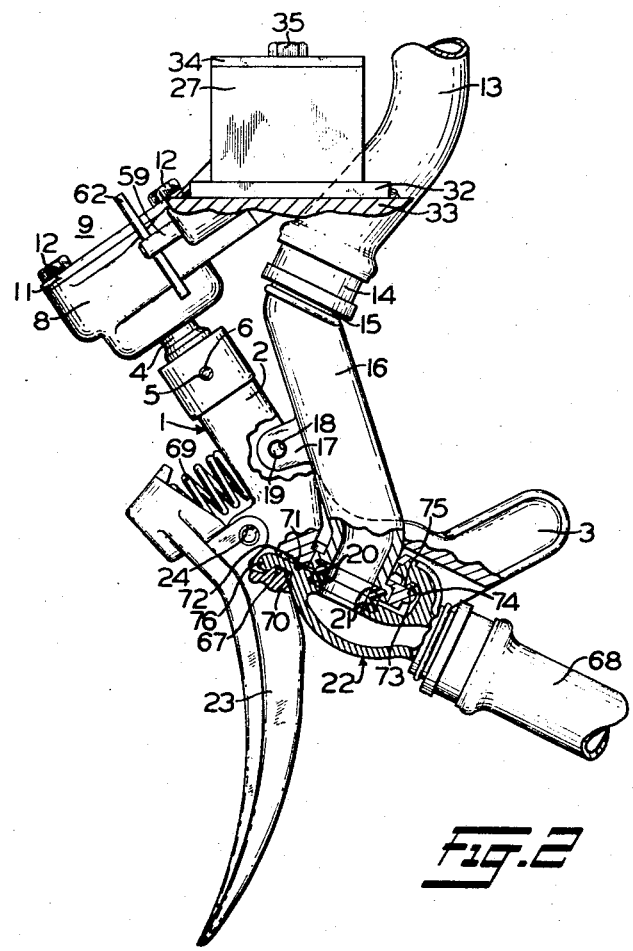
Fig.1
Fig.2

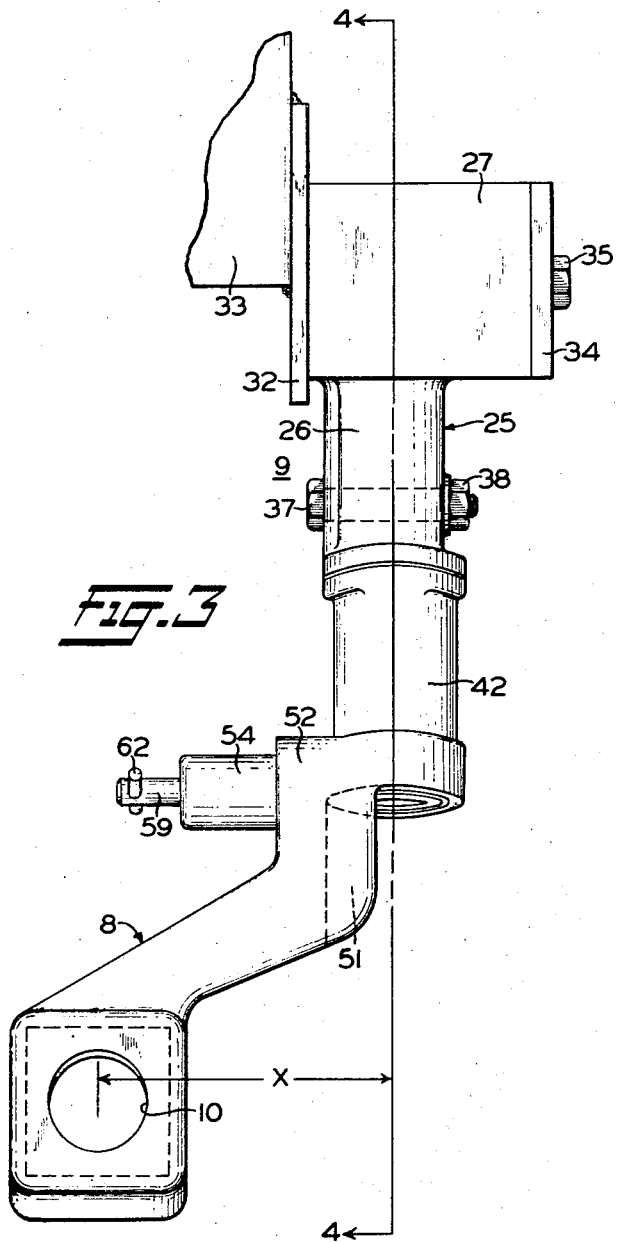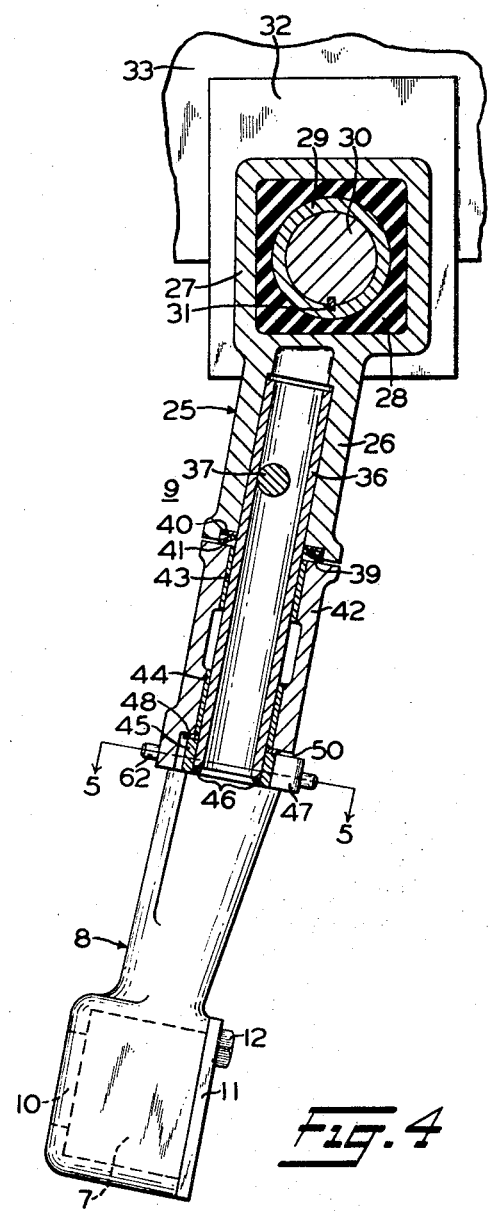

SWIVEL-TYPE CARRIER FOR AUTOMATIC AIR HOSE CONNECTOR

BACKGROUND OF THE INVENTION

In U.S. Pat. No. 3,476,407, issued Nov. 4, 1969 to Fred Temple et al. and assigned to the assignee of the present invention, there is shown and described an automatic-type air hose connector that has one end of an air hose connected to a nipple carried by the mating head of the automatic-type air hose connector which nipple and head can be manually removed as a unit from the lower end of a rigid support member or carrier arm secured at its upper end to the car coupler. When the nipple and mating head are so removed from the support member, a standard manual-type air hose coupling on the end of the hose at the adjacent end of a railway car not provided with automatic-type air hose connectors may be manually coupled to a hose coupling formed within the removed mating head thereby forming a continuous conduit from one car to the other. If it is desired, subsequent to uncoupling these two cars and thereafter the air hose connector in the mating head from the manual-type air hose coupling, to couple the car having the automatic-type air hose connector to a car provided with identical automatic-type air hose connectors, it is first necessary to manually reconnect the unit comprising the nipple and mating head to the lower end of the support member or carrier arm from which it was previously removed. Such a manual reconnecting operation by a trainman is not only time consuming but also dangerous and ofttimes during the winter season almost impossible due to the accumulation of snow on the disconnected parts which quickly solidifies into ice whenever the atmospheric temperature becomes substantially less than freezing.

Accordingly, it is the general purpose of this invention to provide a railway car with an automatic-type air hose connector that is supported on the car coupler by a carrier arm that embodies therein a swivel connection and a locking mechanism therefor. Upon manually unlocking the locking mechanism from one member of the carrier arm, the automatic-type air hose connector may be rocked to a position to enable manual coupling between this automatic-type hose connector and a standard manual-type air hose coupling carried in the end of the air hose provided at the end of a car not provided with automatic-type air hose connectors. The construction of the carrier arm and the swivel connection embodied therein is such that, upon subsequently uncoupling these two cars and thereafter moving one away from the other until the automatic-type air hose connector and the manual-type air hose coupling are disengaged, the automatic-type air hose connector is automatically returned to its original position and locked therein so that this automatic-type air hose connector will thereafter automatically couple to a like automatic-type air hose connector at the adjacent end of a third car provided with automatic-type air hose connectors if such a car is next coupled to the one car.

SUMMARY OF THE INVENTION

According to the present invention, an automatic-type air hose connector is rockably mounted on a car coupler by means of a two-member carrier that has a swivel connection between the members that enables, when one is unlocked from the other, limited rocking of one member that carries the automatic-type hose connector with respect to the other member that is stationary by reason of having one end thereof secured to the car coupler. The adjacent ends of the two members comprise hollow cylinders for receiving therein a sleeve, one end of which is rigidly secured to the hollow cylinder integral with the other member. The hollow cylinder of the one member carries a manually operable lock movable into and out of locking engagement with one side of a boss integral with an annular locking member secured to the lower end of the sleeve. This boss extends into an arcuate slot formed in the one member and provides, when the lock is disengaged therefrom, for limited rocking of this one member relative to the sleeve to enable the automatic-type hose connector carried thereby to be swung or rocked through a chosen angle to a position in which manual coupling may be accomplished between this automatic-type air hose connector and a standard manual-type air hose coupling carried in the end of an air hose provided at the adjacent end of another car not provided with automatic-type air hose connectors.

In the accompanying drawings:

FIG. 1 is a plan view of an automatic-type air hose connector embodying the invention in the position for automatic coupling with a like automatic-type air hose connector carried at the adjacent end of another railway car.

FIG. 2 is a plan view of the automatic-type air hose connector shown in FIG. 1 in the position to which it may be rocked to enable coupling with a manual-type hose coupling.

FIG. 3 is an elevational view of a swivel-type carrier arm suspended from a car coupler with the mating head and automatic-type air hose connector carried therein removed from the lower end of this carrier arm.

FIG. 4 is a cross-sectional view, taken along the line 4—4 of FIG. 3 and looking in the direction of the arrows, showing certain details of the swivel-type carrier arm.

Figure 5:
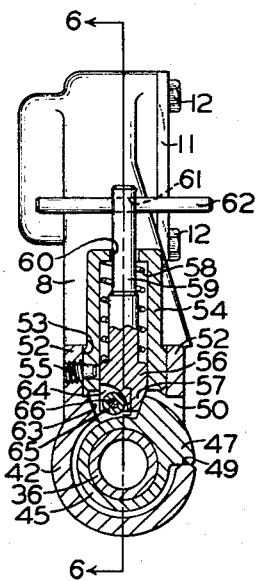
FIG. 5 is a cross-sectional view, taken along the line 5—5 of FIG. 4 and looking in the direction of the arrows, showing details of a locking mechanism.

FIG. 1 of the drawings shows an automatic-type air hose connector 1 in the position it occupies while two adjacent cars, each provided with automatic-type air hose connectors, are coupled, it being understood that these connectors are secured to the car couplers at the adjacent ends of the two coupled railway cars, the manner in which the hose connector 1 is secured to a car coupler by a swivel-type connection being hereinafter described.

The automatic-type air hose connector 1 comprises a mating head 2 which may be in the form of a U-shaped channel member that at one end has formed integral therewith a pair of spaced-apart wing-like guide members 3 only one of which appears in FIGS. 1 and 2, it being understood that the other guide member is directly beneath the guide member shown. The left-hand or opposite end of the U-shaped channel member receives one end of a support pin 4. A drilled hole 5 extends through the U-shaped channel member and the support pin 4 for receiving a roll pin 6 which serves to lock the mating head 2 to the support pin 4. The opposite end of the support pin 4 has formed integral therewith a ball (not shown) which is embedded in a resilient cushion member (not shown) that is bonded to the ball. The contour of the outer surface of this cushion member is that of a polyhedron and conforms to the inner surface of a polyhedral cavity 7 (FIG. 4) provided therefor in the lower end of one member 8 of a carrier arm 9 hereinafter described in detail. With the cushion member disposed in the cavity 7, the support pin 4 extends through an opening 10 therefor in the member 8. A cover plate 11 that is secured to the member 8 by a plurality of cap screws 12, two of which appear in FIGS. 1 and 2, retain the ball and resilient cushion member in the cavity 7.

One end of an air hose 13 is secured by a hose clamp 14 to a shank 15 provided at one end of a hose nipple 16, the other end of this hose 13 being connected to one of the usual angle cocks (not shown) provided at the opposite ends of the brake pipe that extends from end to end of a railway car. Formed integral with the hose nipple 16 intermediate the ends thereof is a lug 17 that is disposed between the opposite sides of the U-shaped channel member. This lug 17 is provided with a bore 18 that is coaxial with a bore in each side of the U-shaped channel member whereby the hose nipple 16 is secured to the mating head 2 by a pin 19 extending through these bores.

As shown in FIG. 2 of the drawings, the other end of the hose nipple 16 has formed therein, as by machining, a gasket groove 20 in which is disposed a resilient gasket 21 that may be identical to the usual hose coupling gasket identified by the same numeral and carried in a like groove provided therefor in a manual-type hose coupling 22. In FIG. 2 this manual-type hose coupling 22 is shown connected to the automatic-type air hose connector 1 by a spring-biased third wing-like guide member 23 that is pivotally mounted on the mating head 2 by means of a pin 24, it being noted that this spring-biased guide member 23 is effective to press the gaskets 21 together to form a fluid tight seal therebetween.

Referring to FIGS. 3 and 4, it will be seen that the carrier arm 9 comprises, in addition to the hereinbefore-mentioned one member 8, a second member 25 consisting of a lower substantially hollow cylindrical portion 26 the upper end of which has formed integral therewith a substantially square cross-sectional casing portion 27. A resilient member or cushion 28 composed of, for example, rubber and having an outer surface contour corresponding to the inner contour of the square casing portion 27, is secured as by being bonded to the outer surface of a bushing 29 so that this cushion 28 is disposed between the bushing 29 and the casing portion 27. The bushing 29 is secured to a pin 30 by a key 31, as shown in FIG. 4. The pin 30 is secured by any suitable means (not shown) to a plate 32 that may be, for example, welded to the vertical side of a car coupler shank 33, as shown in FIG. 3. A cover plate 34 extends over the outer end of pin 30, bushing 29, cushion 28 and casing portion 27 and is secured to the pin 30 by a cap screw 35. The resiliency of the cushion 28 provides for a limited amount of rocking of the carrier arm 9 about the pin 30 in response to the application of a force to the automatic-type air hose connector 1 carried by the member 8 and insures the return of this arm 9 to the position shown in the drawings upon the release of this force.

As shown in FIG. 4, one end of a sleeve member 36 extends into the cylindrical portion 26 of the member 25 and is secured thereto by a bolt 37 and nut 38 (FIG. 3). The lower outer end of the cylindrical portion 26 is provided with a counterbore 39 to receive therein a washer 40 and a Belleville spring 41 the smaller end of which abuts the washer 40.

As can be seen from FIGS. 3 and 4, the hereinbefore-mentioned member 8 has formed integral therewith and off-set from its upper end a hollow cylindrical portion 42 into which extends the other end of the sleeve member 36, it being noted that the larger end of the Belleville spring 41 abuts the upper end of this cylindrical portion 42. As shown in FIG. 4, a pair of spaced-apart bushings 43 and 44 are press-fitted into the cylindrical portion 42 and have a light turning fit with the sleeve member 36 to enable manual rocking of the cylindrical portion 42 and member 8 together with the mating head 2 carried thereby relative to the sleeve member 36 with comparative ease when it is desired to rock the automatic-type air hose connector 1 from the position shown in FIG. 1 to the position shown in FIG. 2 to enable manual coupling with the manual-type hose coupling 22 shown in FIG. 2.

Figure 6:
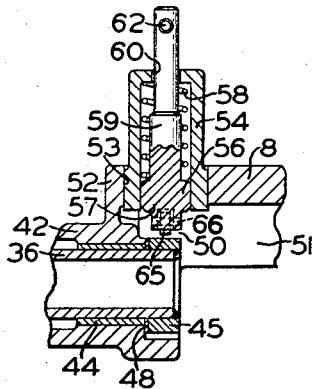
FIG. 6 is a cross-sectional view, taken along the line 6—6 of FIG. 5 and looking in the direction of the arrows, showing further structural details of the locking mechanism.

As shown in FIGS. 4, 5 and 6, an annular locking member 45 is disposed about the lower end of the sleeve 36 and secured thereto as by, for example, welding as indicated by the numeral 46 (FIG. 4). Formed integral with the locking member 45 is a boss or arcuate lobe 47 (FIG. 5) and interposed between this locking member 45 and the lower end of the bushing 44 is an annular wear plate 48 (FIG. 4), it being noted that the Belleville spring 41 is effective via the cylindrical portion 42 to always bias the lower side of this wear plate 48 against the upper end of the annular locking member 45 as the thickness of this plate 48 is reduced by wear resulting from manual rocking of the cylindrical member 42 and the member 8, which supports mating head 2 (FIGS. 1 and 2), relative to the sleeve 36.

While the locking member 45 and the lobe 47 that is integral therewith occupy the position shown in FIG. 5, the lobe 47 is locked against a stop surface 49 formed at one end of an arcuate opening 50 provided in the cylindrical portion 42 at the lower end thereof. In order to provide for sliding the sleeve 36, to which the locking member 45 is secured, as by welding, out of the cylindrical portion 42 in order to replace a worn out wear plate 48 after the bolt 37 and nut 38 are removed and the sleeve 36 withdrawn from cylindrical portion 26, the member 8 is provided with an arucate recess 51 (FIG. 3).

As shown in FIGS. 3, 5 and 6, the lower end of the cylindrical portion 42 has formed integral therewith a boss 52 that is also integral with the member 8, this boss 52 thus serving to connect the member 8 to the cylindrical member 42. This boss 52 is provided with a bore 53 in which is received one end of a cup-shaped locking member housing 54 that is secured to the boss 52 by such as a flat dog-point set screw 55, as shown in FIG. 5.

Slidably mounted in the housing 54 is a cylindrical locking member 56 that has formed integral with one end thereof a conical locking element 57. While the cylindrical portion 42 occupies the position shown in FIG. 5, the conical locking element 57 is biased against the upper end of the lobe 47 by a spring 58 that is disposed about an operating stem 59 that is integral with the other end of the cylindrical locking member 56 and interposed between this locking member 56 and the cup-shaped housing 54. The operating stem 59 extends through a bore 60 provided therefor in the housing 54 and adjacent its outer end is provided with a bore 61 in which is press-fitted an operating handle 62 by means of which a trainman, by exerting a pull thereon, may move the conical locking element 57 out of locking engagement with the lobe 47 whereupon the cylindrical portion 42, boss 52 and member 8 may be manually rocked clockwise, as viewed in FIG. 5, until a stop surface 63 formed on the cylindrical portion 42 at the other end of the hereinbefore-mentioned arcuate opening 50 in the lower end of cylindrical portion 42 abuts the left-hand end of the lobe 47.

As shown in FIGS. 4 and 5, the conical locking element 57 is provided with a slot 64 in which is disposed a roller 65 that is rotatably mounted on a pin 66 which has its opposite ends anchored in that part of the conical locking element 57 that forms the walls of the slot 64.

While the cylindrical portion 42, boss 52 and locking member housing 54 occupy the position shown in FIG. 5, the stop surface 49 is biased against the right-hand end of the lobe 47 by the spring 58 acting through the conical locking element 57 of the cylindrical locking member 56 so that the member 8 of the carrier arm 9 and the automatic-type air hose connector 1 carried by this member 8 occupy the position in which they are shown in FIG. 1, it being understood that the spring 58 is effective via the cylindrical locking member 56 to lock the member 8 and automatic-type air hose connector 1 in this position.

Assume that two railway cars, each of which is provided at each end thereof with an automatic-type air hose connector 1 constituting the present invention, are to be coupled. Consequently, it may be assumed that one end of one of these cars is provided with an automatic-type air hose connector 1 that occupies the position shown in FIG. 1, and the adjacent end of the other car is provided with an identical automatic-type air hose connector (not shown) that occupies a position on this other car for automatic coupling with the automatic-type air hose connector 1 on the one car.

With the exception of the specific swivel-type carrier arm supporting means, as described above, for supporting the mating head 2 on the car coupler shank 33, the remaining portions of this mating head are identical in structure and manner of operation to the corresponding mating heads disclosed in U.S. Pat. No. 3,312,481 issued Apr. 4, 1967 to Fred Temple and assigned to the assignee of the present application. Consequently, if it be assumed that one of the two railway cars is stationary and the other car is moved toward the stationary car to be coupled thereto, the mating heads and automatic-type hose connectors on the two cars will be automatically coupled one to the other in the manner described in U.S. Pat. No. 3,312,481 and need not be repeated here.

When the two cars are uncoupled and thereafter either is moved away from the other, the mating head of the automatic-type air hose connector on the moving car is moved away from the mating head on the stationary car, this movement slightly rocking the guide member 23 on the stationary automatic-type hose connector clockwise, as viewed in FIG. 1, about the pin 24 as a part of the moving mating head (not shown) exerts a force on a knob-like projection 67 integral with the guide member 23.

If it is desired to couple a car provided at each end with an automatic-type air hose connector 1 constituting the present invention to a car not provided with automatic-type air hose connectors but having a standard manual-type hose coupling 22 (FIG. 2) and a hose 68 secured to the end of the brake pipe at each end of this car, prior to coupling the cars, the automatic-type air hose connector 1 at the end of the car that is to be coupled to the car not provided with an automatic air hose connector must be manually rocked from the position in which it is shown in FIG. 1 to the position in which it is shown in FIG. 2.

In order to effect manual rocking of the automatic-type air hose connector 1 from the position shown in FIG. 1 to the position shown in FIG. 2, a trainman will first grasp the operating handle 62 with his hand and thereafter exert a pull thereon in an upward direction, as viewed in FIG. 5. This upward pull on the handle 62 is effective to move the operating stem 59, cylindrical locking member 56, conical locking element 57 and roller 65 in an upward direction, as viewed in FIG. 5, against the yielding resistance of the spring 58 until the roller 65 will pass over the lobe 47.

After the conical locking element 57 has been moved upward out of locking engagement with the lobe 47 in the manner just described, the cylindrical portion 42, boss 52 and member 8 may be manually rocked clockwise, as viewed in FIG. 5, until the stop surface 63 is moved into abutting relationship with the left-hand side of the lobe 47.

Subsequent to effecting the unlocking operation just described, the trainman will manually rock the automatic-type air hose connector 1 clockwise from the position shown in FIG. 1 to the position shown in FIG. 2.

The trainman may now release the handle 62 whereupon the spring 58 (FIG. 5) is rendered effective via the cylindrical locking member 56 to bias the roller 65 against the periphery of the lobe 47, the left-hand side of which now abuts the stop surface 63.

It will be noted from FIG. 4 that the wear plate 48 that rests on top of the annular locking member 45 supports the weight of the cylindrical portion 42, the member 8 that is connected to this portion 42 by the boss 52 that is integral with each, and the automatic-type air hose connector 1 carried by the lower end of member 8, as the cylindrical portion 42 and the bushings 43 and 44 are rocked about the sleeve 36 in response to manual rocking the automatic-type air hose connector 1 from the position shown in FIG. 1 to the position shown in FIG. 2. Consequently, this plate 48 is the only element that is subject to wear and when worn out, that is worn to a minimum allowable thickness, can be replaced with a new wear plate which is very inexpensive in comparison with the other elements of the swivel-type carrier arm 9.

Subsequent to coupling of the car couplers (not shown) at the adjacent ends of the two cars, the trainman will manually rock the guide member 23 of the automatic-type hose connector 1, which now occupies the position shown in FIG. 2, clockwise about the pin 24 against the yielding resistance of a spring 69 far enough to enable the manual-type hose coupling 22 to be manually coupled by him to the automatic air hose connector 1. When thus coupled, the trainman will release the guide member 23 whereupon the knob-like projection 67 on this guide member 23 will be biased against the lip bearing 70 on the manual-type hose coupling 22 by the spring 69 so that the gaskets 21 carried by the automatic-type air hose connector 1 and the manual-type hose coupling 22 are each pressed against the other to form a fluid-tight seal therebetween.

FIG. 2 of the drawings shows an automatic-type air hose connector 1, at one end of a railway car provided at each end with automatic-type air hose connectors embodying the present invention, coupled to a manual-type hose coupling 22 carried in the end of the hose at the adjacent end of another car. It may be assumed that these two cars are coupled one to the other by the car couplers at the adjacent ends of these two cars.

Now let it be supposed that, subsequent to closing the angle cocks at the adjacent ends of the two coupled cars, these two cars are uncoupled in the usual manner, and thereafter either car is pulled away from the other car by a locomotive.

Referring to FIG. 2, which shows the automatic-type air hose connector 1 coupled to the manual-type hose coupling 22, it may be seen that when either car begins to move away from the other car, the manual-type hose coupling 22, the automatic-type air hose connector 1, member 8 and cylindrical portion 42 (FIGS. 3 and 4), off-set distance X (FIG. 3) from the center line of the automatic-type air hose connector 1, are rocked counterclockwise, as viewed in FIG. 2, about the sleeve member 36 (FIG. 4) until the hose 68, which is connected to the angle cock (not shown) at the adjacent end of the car provided with manual-type hose couplings, is stretched taut.

After the hose 68 is thus stretched taut, the continued pulling by the locomotive of one car away from the other car causes a force to be transmitted through the manual-type hose coupling 22, the automatic-type air hose connector 1, pin 4, member 8, boss 52, cylindrical portion 42 and bushings 43, 44 to the sleeve member 36 (FIG. 4) which, since the member 28 is constructed of a resilient material, as hereinbefore stated, is effective to rock the member 25 of the carrier arm 9 clockwise, as viewed in FIG. 4, through a small angle thereby compressing member 28, it being understood that this compression of member 28 increases as the member 25 is rocked clockwise thereby increasing the resistance to the rocking of this member 25 and storing potential energy in the thus compressed resilient member 28.

Referring to FIG. 2, it will be noted that, while the two gaskets 21 are pressed one against the other, a face 71 on the automatic-type air hose connector 1 is spaced a short distance away from a face 72 on the manual-type hose coupling 22. Therefore, as the locomotive continues to pull the one car away from the standing car, subsequent to compressing the resilient member 28 a certain amount, the gaskets 21 are further compressed as a lip bead 73 on the automatic-type air hose connector 1 slides out of a guide arm groove 74 in the manual-type hose coupling 22 and over a guide arm bearing 75 integral with this hose coupling 22 simultaneously as a lip bead 76 on the manual-type hose coupling 22 slides over the knob-like projection 67 on the guide member 23 of the automatic-type air hose connector 1, the guide member 23 being slightly rocked in a clockwise direction about the pin 24 by the force exerted on the projection 67 by the lip bead 76. The distance between the faces 71 and 72 and the further compression of the gaskets 21 are such as to enable the automatic-type air hose connector 1 and the manual-type hose coupling 22 to be thus completely pulled apart one from the other as the car being pulled by the locomotive continues to be moved away from the standing car.

Upon the automatic-type air hose connector 1 on one car and the manual-type hose coupling 22 on the other car being thus pulled apart, force is no longer transmitted through the automatic-type air hose connector 1, pin 4, member 8, boss 52, cylindrical portion 42 and bushings 43, 44 to the sleeve member 36 to maintain the member 25 in the position to which it was rocked in the manner described above. Consequently, upon the pulling apart of the automatic-type air hose connector 1 and the manual-type hose coupling 22, the stored potential energy in the compressed resilient member 28 is released and rendered effective, as this resilient member expands and returns to its original position, to quickly rock the member 25 counterclockwise, as viewed in FIG. 4, through the above-mentioned small angle back to its original position, it being understood that the sleeve member 36, cylindrical portion 42, boss 52, member 8 and automatic-type air hose connector 1 are carried by the member 25, as can be seen from FIGS. 2 and 4.

The cylindrical member 42, bushings 43, 44, boss 52, member 8 and the automatic-type air hose connector 1 carried thereby are rockably mounted relative to the sleeve member 36 which is secured to the cylindrical portion 26 of the member 25 by the bolt 37 and nut 38, as hereinbefore explained. Accordingly, the quick return of the member 25 to its original position, as it is rocked counterclockwise, as viewed in FIG. 4, through the above-mentioned small angle by the expansion of the resilient member 28, applies a force to the rockable mass comprising bushings 43, 44, cylindrical portion 42, boss 52, member 8 and automatic-type air hose connector 1 carried thereby. It will be understood from FIG. 4 that this force lies in the plane determined by the two positions of the axis of the sleeve member 36 that form the above-mentioned small angle through which the member 25 is rocked, or, in other words, the plane of the parts shown in section in FIG. 4, and acts perpendicular to this axis of the sleeve member 36 in the direction to cause counterclockwise rocking of this sleeve member 36. Accordingly, this force thus applied to the rockable mass comprising the bushings 43, 44, cylindrical member 42, boss 52, member 8 and automatic-type air hose connector 1 carried by member 8 acts through the center of gravity of this mass to cause rocking thereof about the axis of the sleeve member 36 (FIG. 4) in a counterclockwise direction, as viewed in FIG. 2, subsequent to the above-described pull apart of the automatic-type air hose connector 1 and manual-type hose coupling 22.

As hereinbefore stated, while the automatic-type air hose connector 1 is coupled to the manual-type hose coupling 22, the left-hand side of the lobe 47 (FIG. 5) of the annular locking member 45 abuts the stop surface 63 and the spring 58 biases the roller 65 against the periphery of this lobe 47.

Accordingly, as the bushings 43, 44, cylindrical member 42, boss 52, member 8 and automatic-type air hose connector 1 are rocked counterclockwise, as viewed in FIGS. 2 and 5, before and after pull apart of the automatic-type air hose connector 1 and the manual-type hose coupling 22, it will be noted from FIG. 5 that the roller 65 rolls along the periphery of the lobe 47 as this counterclockwise rocking, as viewed in FIGS. 2 and 5, occurs.

Accordingly, it will be understood from FIG. 5 that as the member 8, boss 52, locking member 54 and cylindrical portion 42 are thus rocked counterclockwise, the roller 65 rolls along the periphery of the lobe 47 until this roller and the conical locking element 57 are moved past the left-hand end of the lobe 47 whereupon the spring 58 is rendered effective to move the cylindrical locking member 56, conical locking element 57 and roller 65 carried thereby downward until they occupy the position shown in FIG. 5. Consequently, the member 8, boss 52, locking member housing 54 and cylindrical portion 42 are locked to the annular locking member 45 and sleeve member 36 until the operating stem 59, cylindrical locking member 56, conical locking element 57 and roller 65 are again manually moved upward against the yielding resistance of the spring 58 by a trainman exerting an upward pull on the handle 62.

From the foregoing, it is apparent that when two cars, one of which is provided with automatic-type air hose connectors 1 and the other of which is provided with manual-type air hose couplings 22, are uncoupled and thereafter either car is moved away from the other by a locomotive, the connected automatic-type air hose connector 1 and manual-type hose coupling 22 at the adjacent ends of these two cars are pulled apart and the automatic-type air hose connector 1 automatically returned to and locked in the proper position for subsequent automatic coupling with another car provided with automatic-type air hose connectors without any act of assistance by a trainman.

If the car provided with the automatic-type air hose connectors 1 is next coupled to a car provided with manual-type hose couplings 22, the automatic-type air hose connector 1 at the end of the car adjacent the car provided with manual-type hose couplings is first manually rocked from the position shown in FIG. 1 to the position shown in FIG. 2 in the manner hereinbefore explained in detail, and thereafter this automatic-type air hose connector 1 and the manual-type hose coupling 22 at the adjacent end of the car provided with manual-type hose couplings 22 manually coupled by the trainman.

Having now described the invention, what we claim as new and desire to secure by Letters Patent, is:

1. A swivel-type carrier for rockably supporting an automatic-type air hose connector on a coupler of a vehicle to enable, when said automatic-type air hose connector is rocked from a first position, enabling automatic coupling with a like automatic-type air hose connector, to a second position, manual coupling with a manual-type air hose coupling at the end of a hose carried at an adjacent end of another vehicle, said carrier comprising:

a. a first member having at one end a resilient connection with the coupler to provide for rocking of said member relative to the coupler and at the other end support means, wherein the improvement comprises:

b. a second member having at one end means enabling rockable mounting of said second member on said support means and at the other end means enabling removably securing thereto said automatic-type air hose connector, and c. locking means for effecting engagement and disengagement between said first and said second members to enable, when disengaged, rocking of said second member, relative to said first member, to a position in which manual coupling between said automatic-type air hose connector and said manual-type air hose coupling may be effected, d. the structure and arrangement of said members and said locking means being such as to insure that the center of gravity of the rockable mass including said second member and said automatic-type air hose connector is such that, upon pulling away of either one of said vehicles from the other far enough to successively rock said second member relative to said first member until the connection provided between said automatic-type air hose connector and said manual-type hose coupling is stretched taut and thereafter rock said rockable mass and said first member relative to said coupler to compress said resilient connection and store potential energy therein until said automatic-type air hose connector and said manual-type hose coupling pull apart, the release of said stored potential energy applies sufficient force to said rockable mass to cause additional rocking thereof about said first member until said locking means is effective to automatically lock said second member to said first member in said first position.

2. A swivel-type carrier for rockably supporting an automatic-type air hose connector, as recited in claim 1, further characterized in that said means at said one end of said second member comprises a hollow cylinder rockably mounted on said support means at said other end of said first member.

3. A swivel-type carrier for rockably supporting an automatic-type air hose connector, as recited in claim 1, further characterized in that said means at one end of said second member is off-set from said means at the other end of said second member.

4. A swivel-type carrier for rockably supporting an automatic-type air hose connector, as recited in claim 1, further characterized in that said second member comprises two integral arms forming an obtuse angle therebetween.

5. A swivel-type carrier for rockably supporting an automatic-type air hose connector, as recited in claim 1, further characterized in that said second member comprises two arms the adjacent ends of which are integral and form an obtuse angle therebetween, one of said arms having formed integral with its other end said means enabling rockable mounting of said second member on said support means of said first member.

6. A swivel-type carrier for rockably supporting an automatic-type air hose connector, as recited in claim 1, further characterized in that said second member comprises two arms the adjacent ends of which are integral and form an obtuse angle therebetween, one of said arms having formed integral with its other end said means enabling removably securing thereto said automatic-type air hose connector.

7. A swivel-type carrier for rockably supporting an automatic-type air hose connector, as recited in claim 1, further characterized in that said second member comprises two arms the adjacent ends of which are integral and form an obtuse angle therebetween, one of said arms having formed integral with its other end said means enabling rockably mounting of said second member on said support means of said first member, and the other of said arms having formed integral with its other end said means enabling removably securing thereto said automatic-type air hose connector.

8. A swivel-type carrier for rockably supporting an automatic-type air hose connector, as recited in claim 1, further characterized in that said locking means comprises:
   a. an annular locking member provided with a boss and anchored to said support means of said first member,
   b. a locking housing carried by said second member,
   c. a locking element slidably mounted in said locking housing,
   d. biasing means interposed between said locking housing and said locking element for biasing said locking element in the direction of said annular locking member to effect locking of said element against one one side of said boss, and
   e. manual means for moving said locking element against the yielding resistance of said biasing means to a position enabling subsequent manual rocking of said second member relative to said first member whereby said locking element travels in an arcuate path without striking said boss on said annular locking member.

9. A swivel-type carrier for rockably supporting an automatic-type air hose connector, as recited in claim 1, further characterized by wear means carried by said support means of said first member and supporting thereon said second member, and by biasing means interposed between said first and second members for biasing said second member in the direction of said wear means.

10. A swivel-type carrier for rockably supporting an automatic-type air hose connector, as recited in claim 8, further characterized in that said second member is provided with a pair of spaced-apart stops disposed respectively on the opposite sides of said boss to limit rocking in opposite directions of said second member relative to said first member.

11. A swivel-type carrier for rockably supporting an automatic-type air hose connector, as recited in claim 8, further characterized in that said locking housing is removably mounted on said second member.

12. A swivel-type carrier for rockably supporting an automatic air hose connector, as recited in claim 10, further characterized in that upon rocking of said second member in one direction relative to said first member until one of said stops abuts said boss, said biasing means is effective to bias said locking element into abutting contact with both said boss and said other stop thereby locking said second member against rocking relative to said first member so long as said locking element abuts said boss and said other stop.

13. A swivel-type carrier for rockably supporting an automatic-type air hose connector, as recited in claim 12, further characterized in that said locking element has rotatably mounted thereon a rotatable member to provide rolling friction between said locking element and said boss upon rocking of said second member relative to said first member notwithstanding said biasing means being effective to bias said locking element in the direction of said boss.

14. A swivel-type carrier for rockably supporting an automatic-type air hose connector, as recited in claim 12, further characterized in that said locking element constitutes a frustum of a cone, and that one of said stops and said boss each is provided with a surface for contact with said frustum while said biasing means biases said locking element into said abutting contact with both said boss and said other stop.

15. A swivel-type carrier for rockably supporting an automatic-type air hose connector, as recited in claim 12, further characterized in that said locking element constitutes a frustum of a cone having a slot therein, and a rotatable member is disposed in said slot and rotatably mounted with respect to said frustum of a cone to provide rolling friction between said locking element and said boss upon rocking of said second member relative to said first member subsequent to movement of said locking element out of abutting contact with both said boss and said other stop.

* * * * *